C. L. DEETS.
FISHING REEL.
APPLICATION FILED JAN. 20, 1920.
1,353,113.
Patented Sept. 14, 1920.
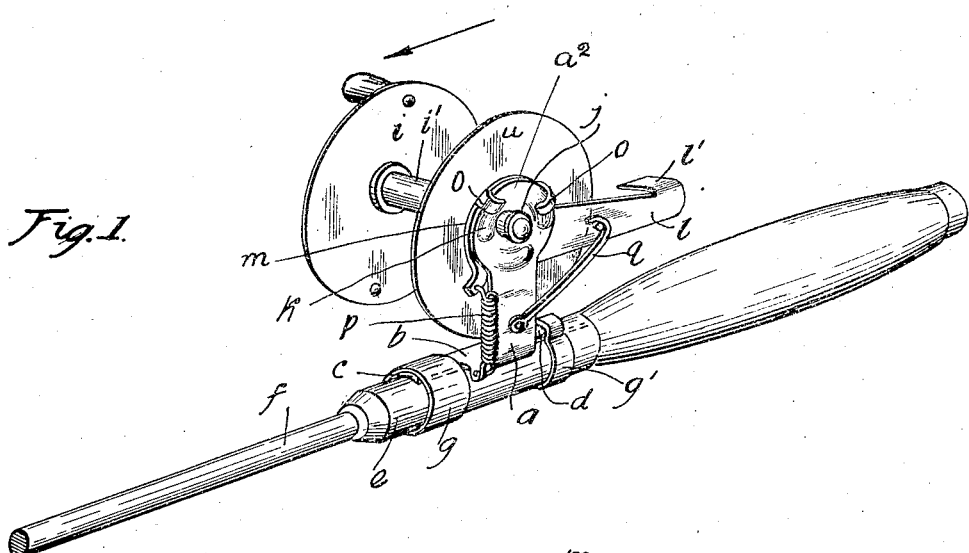
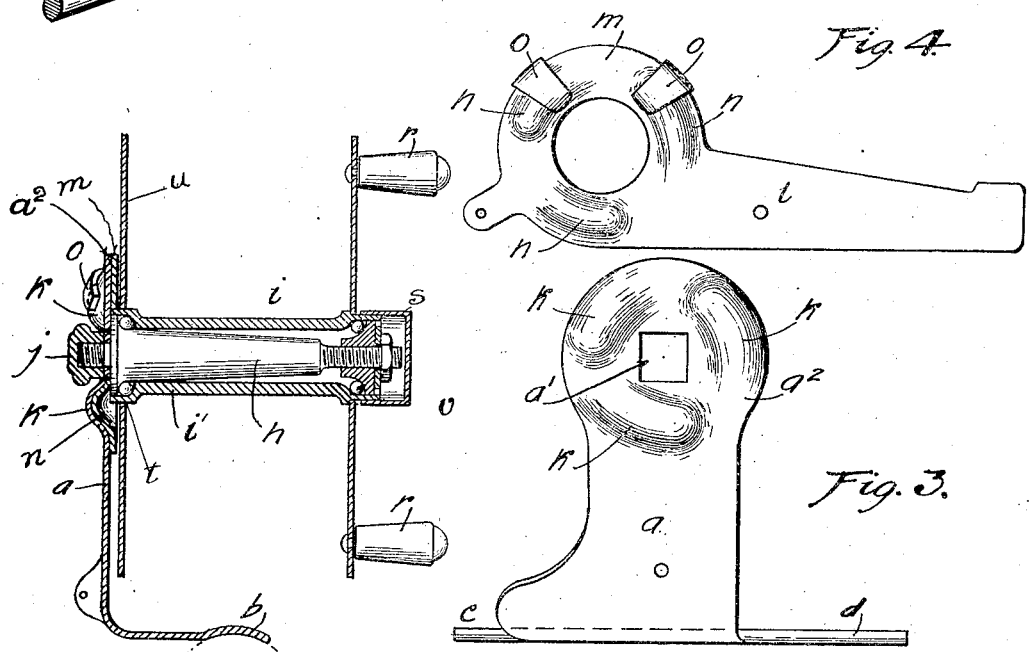
Inventor:
Clarence L. Deets.

UNITED STATES PATENT OFFICE.

CLARENCE L. DEETS, OF PORTLAND, OREGON.

FISHING-REEL.

1,353,113.  Specification of Letters Patent.  Patented Sept. 14, 1920.

Application filed January 20, 1920. Serial No. 352,808.

*To all whom it may concern:*

Be it known that I, CLARENCE L. DEETS, a citizen of the United States, and a resident of Portland, county of Multnomah, State of Oregon, have invented a new and useful Improvement in Fishing-Reels, of which the following is a specification.

In fishing with a pole and reel, the fish caught on the line is frequently permitted to run with the line for a while and its run resisted from time to time; or it may be deemed best to hold the line taut.

With the ordinary fishing reel, it requires one hand to control the spool of the reel.

The object of my invention is to provide means whereby the rotation of the spool of the reel may be controlled by the same hand which holds the fishing pole, so that the fish may be permitted freely to run out the line, or the latter may be held more or less taut, as deemed expedient.

It is further my object to provide a simple device, which may be readily manufactured at comparatively little cost; and furthermore, incidentally so to adapt my device that it may be readily mounted on any fishing pole at present purchasable in the market.

The details of construction of my device are fully illustrated in the accompanying drawings, and hereinafter described.

In the drawings Figure 1 is a perspective showing the handle end of a fishing pole with my controllable reel mounted thereon as in practice;

Fig. 2 is a larger scale cross-section taken in the vertical plane which intersects the axis of the spool of the reel, and the view being taken as the parts would appear if looking in the direction indicated by the arrow in Fig. 1;

Fig. 3 is a side elevation of the standard of my reel;

Fig. 4 is a detail in side elevation of the lever of the brake lever of my controllable reel; and Figs. 5 and 6 are diagrammatic illustrations of the construction and coöperation between the cam surfaces provided on the hub of the standard and the hub of the lever, respectively.

My reel consists of a metal standard $a$ made with a foot $b$ (see Fig. 1), having longitudinal projections $c$, $d$, which are adapted for being placed on a shank $e$ of the fishing pole $f$; and the standard is secured in place by rings $g$, $g'$. The standard supports the spindle $h$ of the spool $i$ of my reel. See Fig. 2. The spool is mounted by ball bearings on the spindle $h$ as illustrated in Fig. 2; the construction shown being similar to that by which the pedals of a bicycle are mounted. In order to securely hold the spindle $h$ in place the standard $a$ is made with a square hole $a'$ (see Fig. 3) and the related end of the spindle is made square in cross-section so that the spindle will be rigidly held in the shank by a nut $j$ which is threaded on the extremity of the spindle, and bears on the hub $a^2$.

The hub $a^2$ of the standard is made with cam-surfaces $k$ spaced equidistant from each other and concentric with the axis of the spindle; said cam surfaces being preferably pressed out as illustrated in Figs. 2 and 3.

Between the hub of the standard $a$ and the related side of the spool $i$, there is mounted on that portion of the hollow axle $i'$ of the spool projecting beyond the side $u$ of the latter, a lever $l$ which is rotatably mounted on the flange $t$ of said hollow axle $i'$. The lever $l$ is made with a hub $m$ in which hub are formed cam-surfaces $n$, corresponding with the cam-surfaces $k$ of the hub of the standard $a$. The cam-surfaces $n$ are adapted for seating in said cam-surfaces $k$. (See diagrams Figs. 5 and 6.) The co-action between the cam-surfaces $k$ of the hub of the standard, and the cam-surfaces $n$ of the hub of the lever, are diagrammatically illustrated in Figs. 5 and 6. The lever $l$ is controlled by a coil spring $p$. Normally said cam-surfaces $k$ and $n$ will be relatively positioned as illustrated in Fig. 5; but when the lever $l$ is depressed, the cam-surface $n$ of the lever $l$ will be moved to its position in Fig. 6, in so doing causing the hub $m$ of the lever $l$ to bear with more or less friction, depending upon the adjustment of the parts as hereinafter explained, and upon the degree of depression of the lever $l$, against the adjacent side of the spool $i$, and hence causing the brake-like effect upon the latter.

The hub $m$ is made with integral fingers $o$, on the exterior, and said fingers are located and adapted to overlie the cam surfaces $k$ of the hub of the standard. The function of said fingers $o$ is to pull the hub of the cam-lever away, or retract it as it were from the side of the spool, so as to release the latter and again permit it to revolve freely.

The lever $l$ is for convenience made with a finger piece $i'$.

In order to avoid the necessity of holding the lever $l$ down continuously, when it is desired to impose a slight drag-braking-effect on the spool $i$, I provide a hook $q$ by which the cam-lever may be held in a partially depressed position.

The spool $i$ of the reel is provided with the usual handles $r$.

The operation of my device is apparent from the description given of its construction.

By taking off the cap $s$ and adjusting the nut $v$, the hub $a^2$ of the standard $a$ may be drawn nearer to or spaced farther from the side $u$ of the spool $i$, thereby varying the braking force with which the hub $m$ of the lever $l$ will bear against said spool side $u$.

The braking force of the lever must be adjusted to the tensile strength of the line.

By said adjustment the reel can be so set that when the brake lever $l$ is depressed to the fullest extent the reel will resist rotation under a predetermined pull on the line. Assuming such pull to be 10 pounds, the fish would have to exert a pull of over 10 pounds before he could run farther with the line. When the fish stops running and swims back, the slack in the line may be wound up on the reel. The fisherman being able to control the break lever $l$ with the same hand by which he holds the pole, therefore has the other hand free to operate the reel.

I claim:

1. A fishing reel comprising a standard, a rotatable spool, a cam-lever having a hub and fulcrumed on the axis of the spindle between the standard and the adjacent side of the spool, cam-surfaces formed in the hub of the standard radially of, and concentric with the axis of the spool, corresponding cam-surfaces formed in the hub of the lever, whereby when the lever is depressed the cam-surfaces will move the hub of the lever against and cause it to exert a frictional bearing on the adjacent side of the spool.

2. A fishing reel comprising a standard, a rotatable spool, a cam-lever having a hub and fulcrumed on the axis of the spindle between the standard and the adjacent side of the spool, cam-surfaces formed in the hub of the standard radially of, and concentric with the axis of the spool, corresponding cam-surfaces formed in the hub of the lever, whereby when the lever is depressed, the cam-surfaces will move the hub of the lever against and cause it to exert a frictional bearing on the adjacent side of the spool, means for retracting the hub of the cam-lever from the side of the spool when the cam-lever is given reverse motion.

3. A fishing reel comprising a standard, a rotatable spool, a cam-lever having a hub and fulcrumed on the axis of the spindle between the standard and the adjacent side of the spool, cam-surfaces formed in the hub of the standard radially of, and concentric with the axis of the spool, corresponding cam-surfaces formed in the hub of the lever, whereby when the lever is depressed, the cam-surfaces will move the hub of the lever against and cause it to exert a frictional bearing on the adjacent side of the spool, the hub of the cam-lever having fingers located to overlie the cam-surfaces of the hub of the standard, whereby when the cam-lever is permitted reverse motion, the hub of the cam-lever is retracted from the side of the spool.

4. A fishing reel comprising a standard, a rotatable spool, a cam-lever having a hub and fulcrumed on the axis of the spindle between the standard and the adjacent side of the spool, cam-surfaces formed in the hub of the standard radially of, and concentric with the axis of the spool, corresponding cam-surfaces formed in the hub of the lever, the latter cam-surfaces being adapted for seating in the cam-surface of the standard, whereby when the lever is depressed, the cam-surfaces will move the hub of the lever against and cause it to exert a frictional bearing on the adjacent side of the spool, the hub of the cam-lever having fingers located to overlie the cam-surfaces of the hub of the standard, whereby when the cam lever is permitted reverse motion, the hub of the cam lever is retracted from the side of the spool.

5. A fishing reel comprising a standard, a rotatable spool, a spring controlled cam-lever having a hub and fulcrumed on the axis of the spindle between the standard and the adjacent side of the spool, cam-surfaces formed in the hub of the standard radially of, and concentric with the axis of the spool, corresponding cam-surfaces formed in the hub of the lever, whereby when the lever is depressed, the cam-surfaces will move the hub of the lever against and cause it to exert a frictional bearing on the adjacent side of the spool, means for retracting the hub of the cam-lever from the side of the spool when the cam-lever is given reverse motion.

6. A fishing reel comprising a standard, a rotatable spool, a cam-lever having a hub and fulcrumed on the axis of the spindle between the standard and the adjacent side of the spool, cam-surfaces formed in the hub of the standard radially of, and concentric with the axis of the spool, corresponding cam-surfaces formed in the hub of the lever, whereby when the lever is depressed, the cam-surfaces will move the hub of the lever against and cause it to exert a frictional bearing on the adjacent side of the spool, means for retracting the hub of the cam-lever from the side of the spool when the cam-lever is given reverse motion, means for holding the lever in partially depressed position.

7. A fishing reel comprising a standard, a spindle supported thereby, a spool rotatably mounted on the spindle, a spring controlled cam-lever having a hub and fulcrumed on the axis of the spindle between the standard and the adjacent side of the spool, cam-surfaces formed in the hub of the standard radially of, and concentric with the axis of the spool, corresponding cam-surfaces formed in the hub of the lever, the latter cam-surfaces being adapted for seating in the cam-surface of the standard, whereby when the lever is depressed, the cam-surfaces will move the hub of the lever against and cause it to exert a frictional bearing on the adjacent side of the spool, means for retracting the hub of the cam-lever from the side of the spool when the cam-lever is given reverse motion.

8. A fishing reel comprising a standard, a spindle supported thereby, a spool rotatably mounted on the spindle, a spring controlled cam-lever having a hub and fulcrumed on the axis of the spindle between the standard and the adjacent side of the spool, cam-surfaces formed in the hub of the standard radially of, and concentric with the axis of the spool, corresponding cam-surfaces formed in the hub of the lever, the latter cam-surfaces being adapted for seating in the cam-surfaces of the standard whereby when the lever is depressed, the cam-surfaces will move the hub of the lever against and cause it to exert a frictional bearing on the adjacent side of the spool, the hub of the cam-lever having fingers located to overlie the cam-surfaces of the hub of the standard, whereby when the cam-lever is permitted reverse motion, the hub of the cam-lever is retracted from the side of the spool.

9. A fishing reel comprising a standard, a spindle supported thereby, a spool rotatably mounted on the spindle, a spring controlled cam-lever having a hub and fulcrumed on the axis of the spindle between the standard and the adjacent side of the spool, cam-surfaces formed in the hub of the standard radially of, and concentric with the axis of the spool, corresponding cam-surfaces formed in the hub of the lever, the latter cam-surfaces being adapted for seating in the cam surface of the standard, whereby when the lever is depressed, the cam-surfaces will move the hub of the lever against and cause it to exert a frictional bearing on the adjacent side of the spool, the hub of the cam-lever having fingers located to overlie the cam-surfaces of the hub of the standard, whereby when the cam-lever is permitted reverse motion, the hub of the cam-lever is retracted from the side of the spool, means for holding the lever in partially depressed position.

10. A fishing reel comprising a standard, a rotatable spool, a cam-lever having a hub and fulcrumed on the axis of the spindle between the standard and the adjacent side of the spool, cam-surfaces formed in the hub of the standard radially of, and concentric with the axis of the spool, corresponding cam-surfaces formed in the hub of the lever, whereby when the lever is depressed the cam-surface will move the hub of the lever against and cause it to exert a frictional bearing on the adjacent side of the spool, and means for relatively adjusting said standard and the adjacent side of the spool thereby adjusting the degree of said frictional bearing.

CLARENCE L. DEETS.